United States Patent [19]
Pond et al.

[11] Patent Number: 5,681,080
[45] Date of Patent: Oct. 28, 1997

[54] VEHICLE SEAT FOR PERSON WEARING SELF-CONTAINED BREATHING APPARATUS

[75] Inventors: George M. Pond, Wisconsin Dells; Douglas C. Hahn, La Valle; Timothy E. Siegel, Neenah; Richard F. Demski, Appleton, all of Wis.

[73] Assignee: Seats, Inc., Reedsburg, Wis.

[21] Appl. No.: 591,399

[22] Filed: Jan. 25, 1996

[51] Int. Cl.$^6$ ............................................. A47C 7/62
[52] U.S. Cl. .............................. 297/188.05; 297/188.04
[58] Field of Search ............................ 297/217.1, 188.04; 248/311.2, 311.3, 313

[56] References Cited

U.S. PATENT DOCUMENTS

| | | | |
|---|---|---|---|
| 2,633,905 | 4/1953 | Geldbaugh | 155/188 |
| 3,204,775 | 9/1965 | Smith et al. | 211/75 |
| 3,466,091 | 9/1969 | De Grusso | 297/390 |
| 3,547,391 | 12/1970 | Johnson | 248/311.3 |
| 3,667,714 | 6/1972 | Ziaylek, Jr. | 248/284 |
| 3,823,907 | 7/1974 | Ziaylek, Jr. | 248/313 |
| 3,971,591 | 7/1976 | Ziaylek | 297/188.04 |
| 4,431,206 | 2/1984 | Pryor | 280/289 WC |
| 4,466,662 | 8/1984 | McDonald et al. | 297/406 |
| 4,848,714 | 7/1989 | Ziaylek, Jr. et al. | 248/313 |
| 5,213,392 | 5/1993 | Bostrom et al. | 297/188.04 |
| 5,275,462 | 1/1994 | Pond et al. | 297/188.04 |
| 5,314,233 | 5/1994 | Bostrom et al. | 297/217.1 |
| 5,354,029 | 10/1994 | Ziaylek, Jr. et al. | 297/188.04 X |

OTHER PUBLICATIONS

Brochure Flamefighter—SCBA Seat & Flamefighter Crew Seat, p. 5.
Brochure Seats Incorporated—SCBA 911 Fire Apparatus Seat.
Brochure Seats Incorporated—911 Series Brochure (1991).
Brochure Superior Equipment Co. Brochure—First in SCBA Seat.
Brochure ZICO Brochure (pp. 4–8, and 28) Breathing Apparatus Holders and SCBA Holders (1987).
Brochure ZICO Brochure (pp. 4–9) Breathing Apparatus Holders and SCBA Holders (1993).
Brochure ZICO Brochure—Tubular Quic–Seat with Headrest.
Brochure ZICO Brochure—Tubular Back Fram Quic–Seat.

*Primary Examiner*—Peter M. Cuomo
*Assistant Examiner*—Stephen Vu

[57] ABSTRACT

A vehicle seat for supporting a person wearing a self-contained breathing apparatus, the self-contained breathing apparatus including a tank, the seat including: a frame including a pair of vertical frame members, the vertical frame members being spaced apart to permit the tank to be passed therebetween; and a bracket assembly extending between the vertical frame members for releasably supporting the tank, the bracket assembly including a pair of side bars extending rearwardly from respective of the vertical frame members, the bracket assembly including a depth adjustment bar releasably mounted between the side bars, and the bracket assembly including a tank clip supported by the depth adjustment bar for receiving the tank.

19 Claims, 5 Drawing Sheets

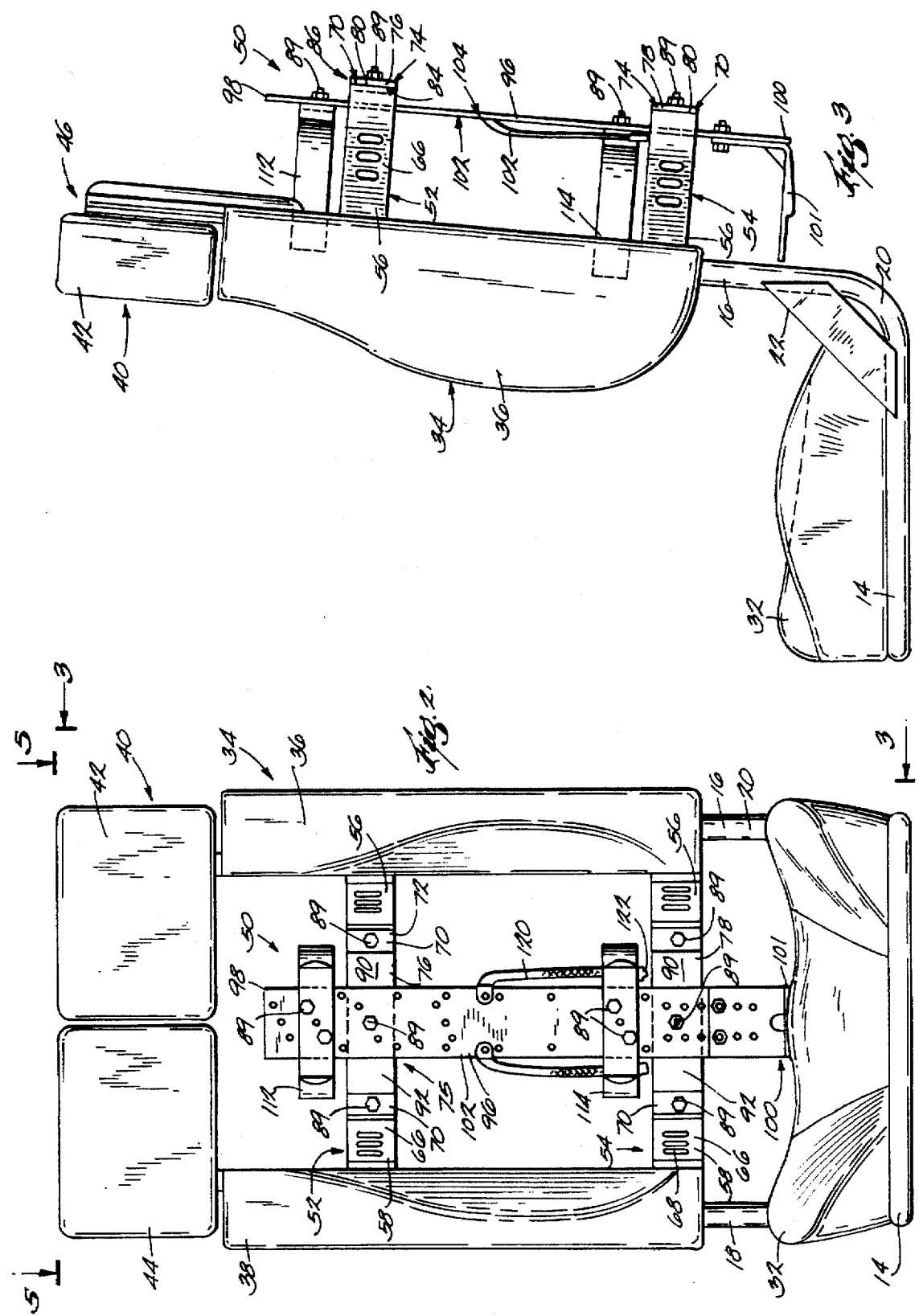

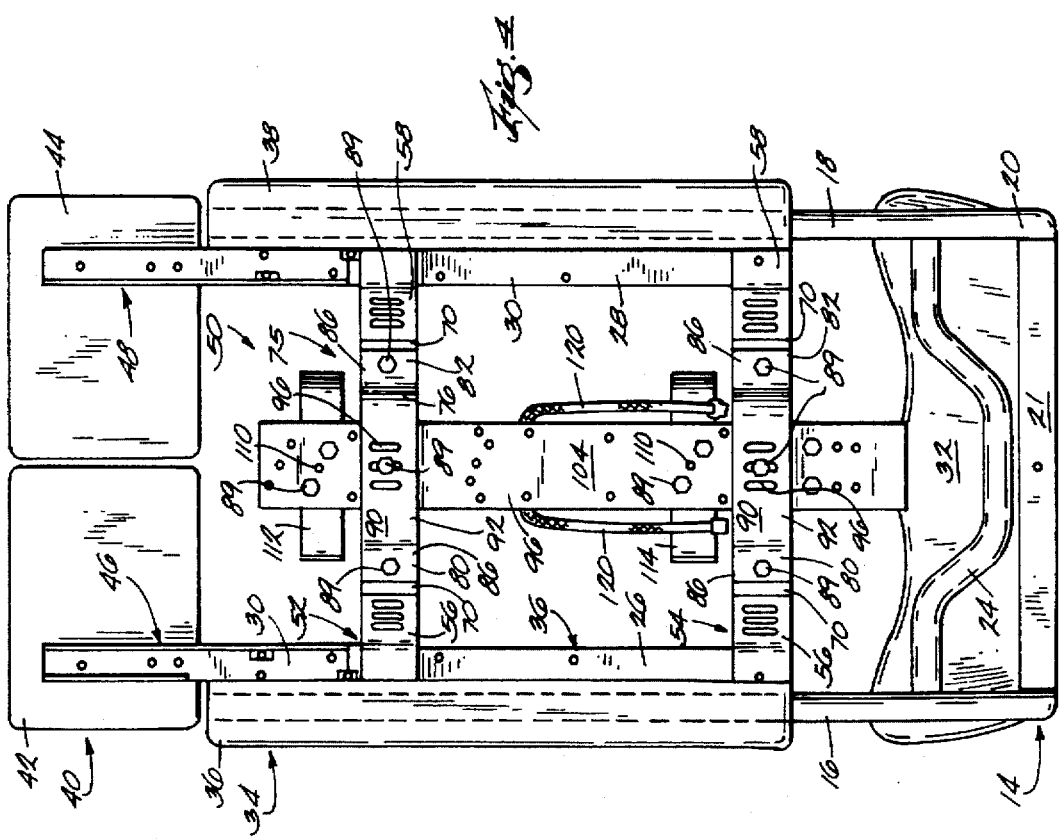

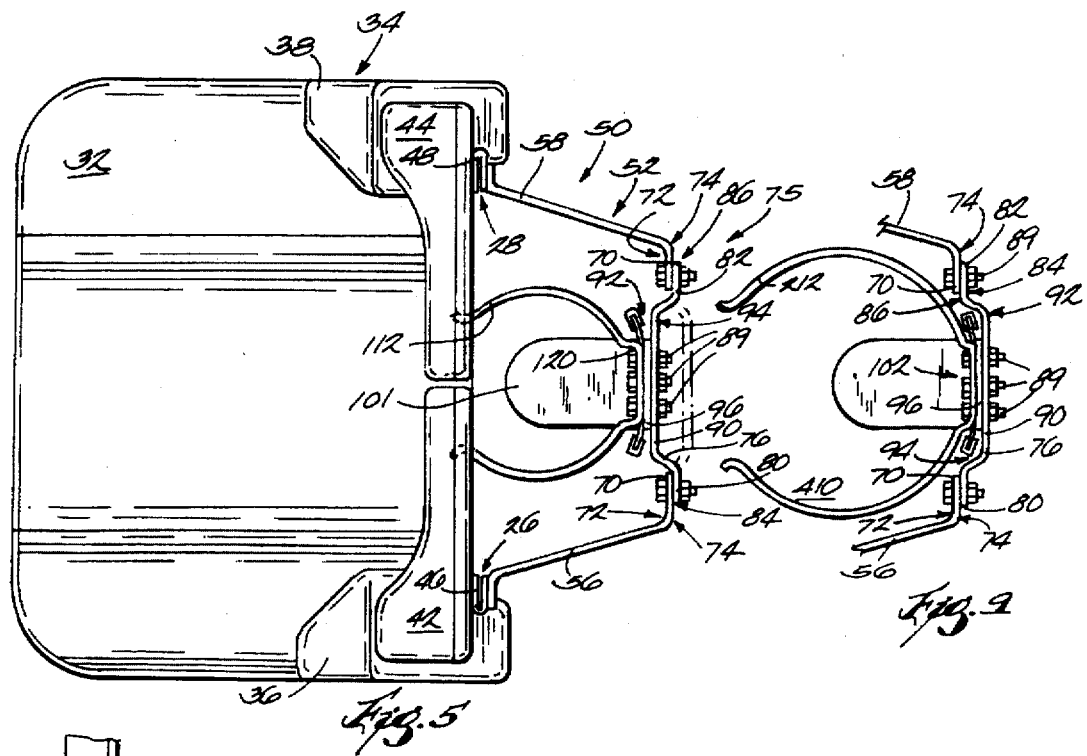
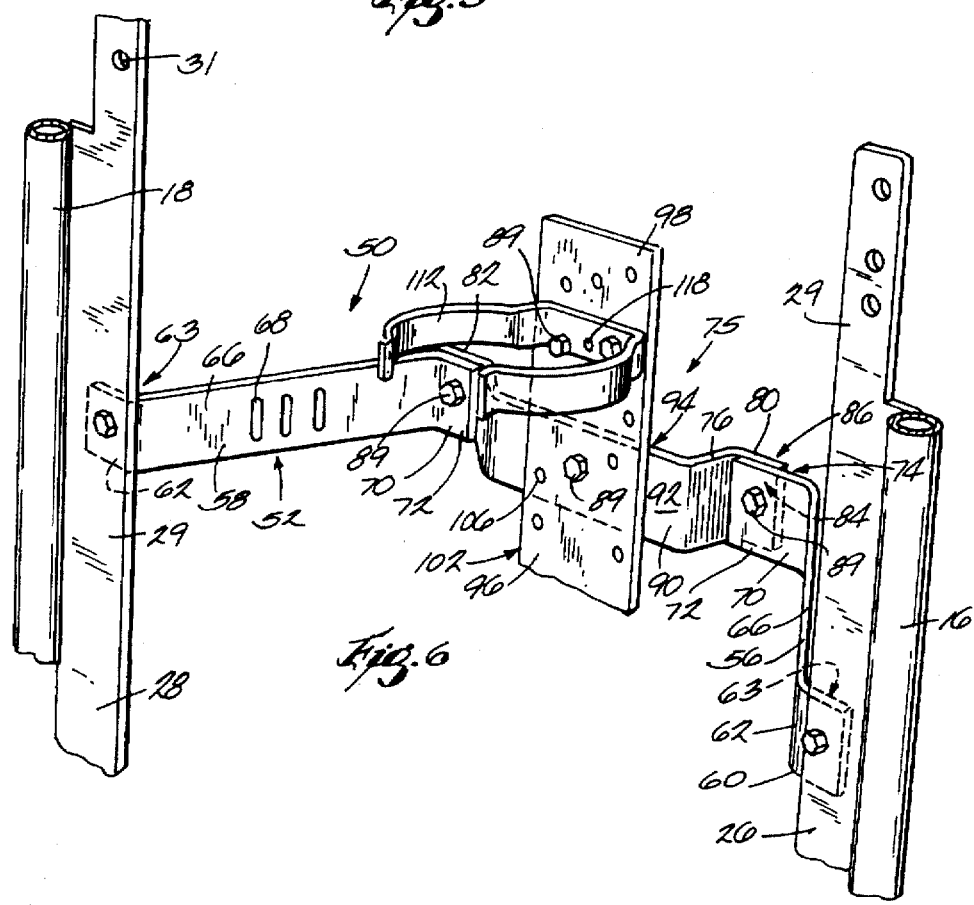

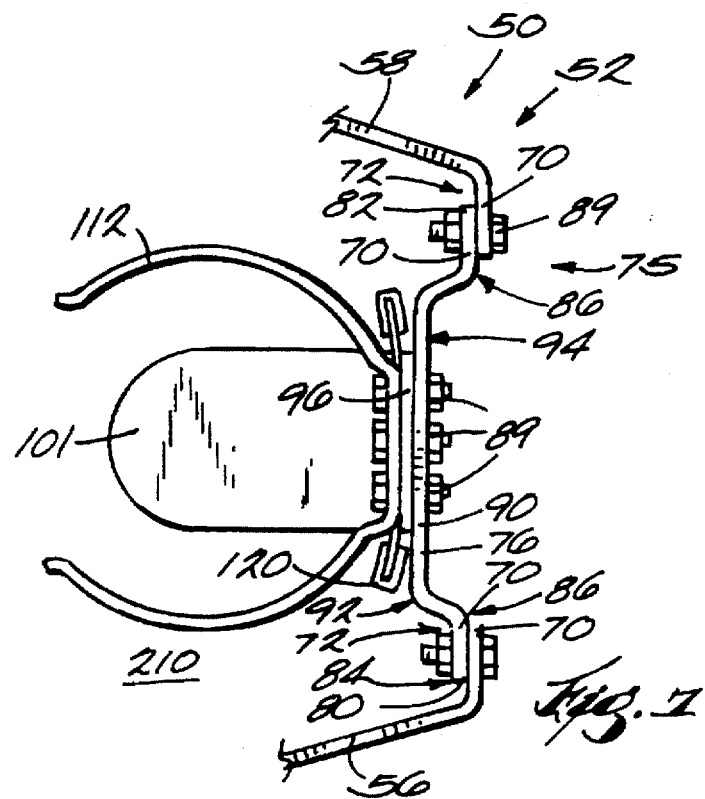
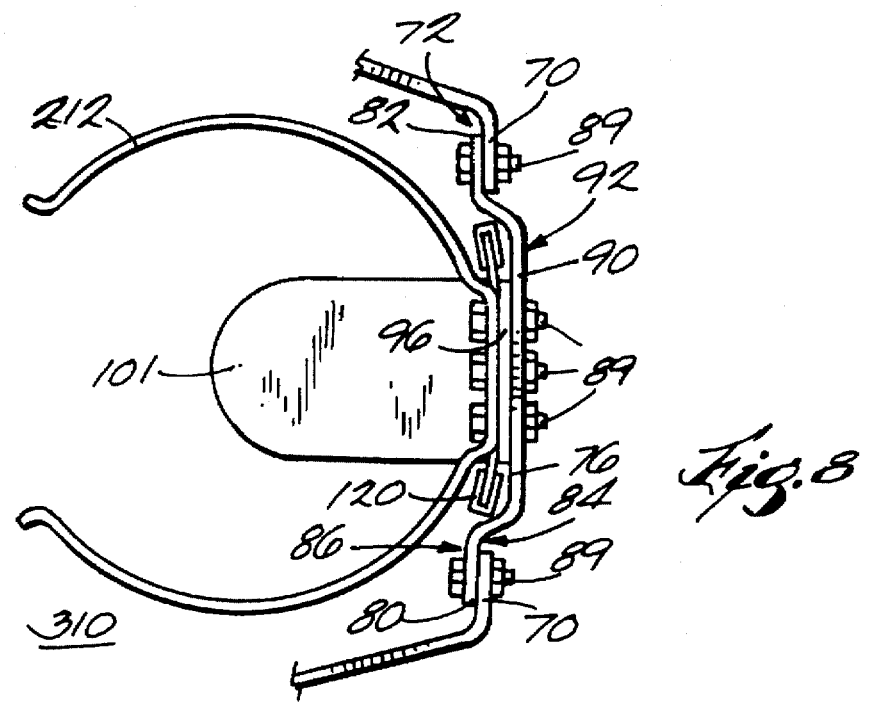

VEHICLE SEAT FOR PERSON WEARING SELF-CONTAINED BREATHING APPARATUS

BACKGROUND OF THE INVENTION

1. Field of the Invention

The present invention relates generally to vehicle seats. More particularly, the invention relates to a vehicle seat for use by a person wearing a self-contained breathing apparatus.

2. Reference to Prior Art

Firemen and other emergency personnel often wear self-contained breathing apparatus when responding to fires or other emergencies. A self-contained breathing apparatus includes an air tank which is supported by shoulder straps on the back of the user and a hose which is connected from the tank to a face mask. Emergency vehicles such as fire trucks are commonly equipped with seats which are adapted for use by persons wearing a self-contained breathing apparatus. Such a seat is disclosed in U.S. Pat. No. 5,275,462, which is assigned to one of the assignees of the present application and which is incorporated herein by reference. The seat disclosed therein has a frame and includes a seat cushion and a seat back assembly which are supported by the frame. The seat back assembly includes a pair of seat back cushion members which are spaced apart to house therebetween a self-contained breathing apparatus. A tank bracket is mounted between and rearwardly of the spaced apart seat back cushion members and is adapted to house the tank of the self-contained breathing apparatus. The tank bracket includes a pair of vertically spaced tank clips for receiving and supporting the upper and lower portions of the tank. The seat also includes a headrest assembly which is positioned above the seat back assembly.

SUMMARY OF THE INVENTION

A problem in the prior art is that the seats are not readily adjustable for accommodating tanks of different sizes without removing the seat from the vehicle and without removing the entire tank bracket from the frame. This frequently results in misuse of the seat because the tank is improperly supported by an incorrectly sized tank bracket. In order to accommodate a tank of a different size, typically either a different tank bracket must be installed in place of the original tank bracket, or the entire tank bracket must be removed and re-mounted in a different position.

The invention provides a seat including a bracket assembly for receiving the tank and which is readily adjustable for accommodating tanks of different sizes without removing the entire bracket assembly from the frame of the seat and without removing the seat from the vehicle. More particularly, the invention provides a seat which includes a frame having a frame bottom and a pair of spaced apart, vertical frame members. A seat cushion is supported by the frame bottom, and a seat back assembly is supported by the vertical frame members. The seat back assembly includes a pair of seat back cushion members which are spaced apart to permit the tank to pass therebetween. The seat also includes a headrest assembly having a pair of movable headrest members which are pivotable relative to the seat back cushion members for permitting the tank to be readily placed or removed from between the seat back cushion members.

The seat includes a bracket assembly which is mounted on the frame rearward of the seat back assembly for receiving and supporting the tank. The bracket assembly includes upper and lower pairs of side bars which extend rearwardly from the vertical frame members and which terminate in spaced relation to each other and in spaced relation to the seat back assembly. Upper and lower depth adjustment bars are releasably mounted between the respective upper and lower pairs of side bars. A pair of tank clips and a rest are supported by a vertical support bar which is releasably mounted between the upper and lower depth adjustment bars. The depth adjustment bars can be mounted in different positions on the rear ends of the side bars to adjust the depth in the horizontal direction of the tank clips relative to the seat back assembly. In particular, each depth adjustment bar has a major portion which is offset or spaced in the lateral direction from a longitudinal plane extending through the ends of the depth adjustment bar. The depth in the horizontal direction of the tank clips relative to the seat back assembly is adjustable by mounting the depth adjustment bars in different positions on the rear ends of the side bars, such that the major portion of each depth adjustment bar is offset in the forward or rearward horizontal direction in relation to the seat back assembly. The tank clips are releasably mounted on the vertical support bar and thus can be replaced with different tank clips for receiving a different size tank.

Objects and advantages other than those set forth above will become apparent to those skilled in the art upon review of the following detailed description, drawings and claims.

BRIEF DISCUSSION OF THE DRAWINGS

FIG. 2 is a front elevational view of the seat shown in FIG. 1.

FIG. 3 is a side view taken along line 3—3 in FIG. 2.

FIG. 4 is a rear elevational view of the seat shown generally in FIG 1.

FIG. 5 is a top view taken along line 5—5 in FIG. 2.

FIG. 6 is an enlarged partial perspective view of the bracket assembly shown generally in FIG. 2.

FIG. 7 is an enlarged partial top view of an alternative configuration the bracket assembly shown generally in FIG. 5.

FIG. 8 is an enlarged partial top view of a second alternative configuration of the bracket assembly shown generally in FIG. 5.

FIG. 9 is a partial top view of a third alternative configuration of the bracket assembly shown generally in FIG. 5.

Figure 1:
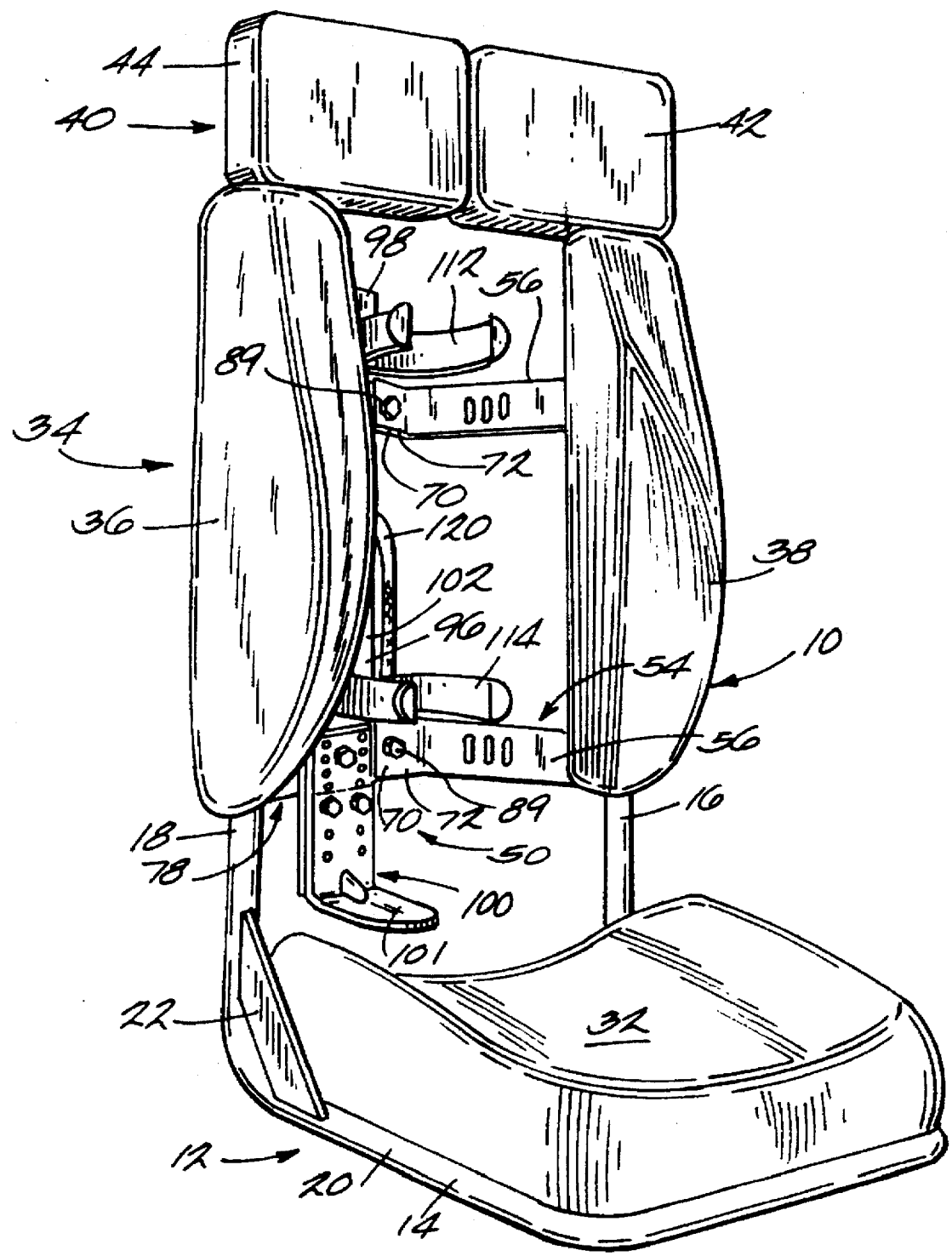
FIG. 1 is a front perspective view of a seat embodying various features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in the drawings is a vehicle seat 10 embodying various features of the invention. The seat 10 is adapted for supporting a person wearing a self-contained breathing apparatus (not shown). The self contained breathing apparatus includes a cylindrical tank and a pair of shoulder straps which are connected to the tank. The shoulder straps are worn over the shoulders of the person so that the tank rests against the person's back.

The seat 10 includes a frame 12 having a frame bottom 14 and a pair of spaced apart, vertical frame members 16 and 18 which extend upwardly from the rearward portion of the frame bottom 14. In the illustrated embodiment, the frame 12 includes an elongated main frame member 20 which is bent to form a generally U-shaped outline defining both the frame bottom 14 and the vertical frame members 16 and 18. The upper end portions of the legs of the "U" define the vertical frame members 16 and 18 and are turned upwardly about 85° from the intermediate section of the "U", which defines the frame bottom 14. In the illustrated embodiment, the main frame member 20 is a length of steel tubing. A pair of seat cushion supports 21 (one shown in FIG. 4) extend laterally between the legs of the main frame member 20 in the frame bottom 14. The frame 12 also includes (FIGS. 1 and 4) a pair of gussets 22 which are rigidly joined between the lower ends of the vertical frame members 16 and 18 and the respective rearward portion of the frame bottom 14. A cross member 24 (FIG. 4) is rigidly joined between the lower end portions of the vertical frame members 16 and 18.

The vertical frame members 16 and 18 include (FIGS. 4 and 6) respective elongated mounting bars 26 and 28 which are rigidly joined to the main frame member 20. The mounting bars 26 and 28 extend upwardly beyond the respective ends of the main frame member 20. Each of the mounting bars 26 and 28 has a forward surface 29 facing in the direction of the seat back assembly (described below) and an opposite rear surface 30. Each of the mounting bars 26 and 28 has therein a plurality of longitudinally spaced mounting holes 31 (FIG. 6). In the illustrated embodiment, the mounting bars 26 and 28 consist of steel plate material which is welded to the main frame member 20.

A seat cushion 32 is supported by the frame bottom 14. The seat 12 also includes a seat back assembly 34 which is supported by the vertical frame members 16 and 18. The seat back assembly 34 includes a pair of seat back cushion members 36 and 38 which are spaced apart to permit the tank to pass therebetween. More particularly, the seat back cushion members 36 and 38 are mounted on the respective mounting bars 26 and 28 by fasteners 39 which are received in respective of the mounting holes 31. In the illustrated embodiment, the fasteners 39 are bolt and nut combinations (hereinafter "bolts"). In another embodiment, other suitable fasteners such as, for example, rivets may be used.

The seat 12 also includes a headrest assembly 40 which is supported by the vertical frame members 16 and 18. The headrest assembly 40 includes a pair of movable headrest members 42 and 44 which are connected to the upper portions of the vertical frame members 16 and 18 by respective hinges 46 and 48 (FIG. 5). The hinges 46 and 48 are mounted on the respective mounting bars 26 and 28 by fasteners 39 which are received in respective of the mounting holes 31. The headrest members 42 and 44 are pivotable about 90° relative to the seat back cushion members 36 and 38 about respective vertical axes defined by the hinges 46 and 48. Each of the headrest members 42 and 44 is pivotable from a closed or first position (FIGS. 1–6) for supporting a person's head to an open or second position (not shown) to provide clearance for the tank to be readily placed or removed from between the seat back cushion members 36 and 38.

The seat 10 includes a bracket assembly 50 which is mounted on the frame 12 for supporting the tank. The bracket assembly 50 includes spaced upper and lower pairs 52 and 54 of first and second side bars 56 and 58. The first and second side bars 56 and 58 are mirror images of each other, and only the first side bar 56 will be further described. In the illustrated embodiment, the first side bar 56 is an elongated member having a short forward end 60. The forward end 60 has a forward mounting surface 62 and an oppositely facing rear surface 63. The forward mounting surface 62 abuts the rear surface 30 of the mounting bar 26. The forward end 60 has therein a mounting hole (not shown) which extends between the forward mounting surface 62 and the rear surface 63 and which is aligned with a respective mounting hole 31 in the mounting bar 26. A bolt 41 extends through the aligned mounting holes for rigidly securing the forward end 60 of the first side bar 56 to the mounting bar 26. In another embodiment, the first side bar 56 is rigidly secured to the mounting bar 26 by other suitable fastening means such as, for example, by rivets or welding. The first side bar 56 also has an elongated major portion 66 which extends from the forward end 60 rearwardly and inwardly (i.e., toward the second side bar 58) in the horizontal direction at an angle of about 105°. The major portion 66 has therein three longitudinally spaced apertures 68. The first side bar 56 also has a short rear end 70 which extends inwardly from the major portion 66 at an angle of about 105°. The rear end 70 is spaced rearwardly and inwardly from and is parallel to the forward end 60. The rear end 70 thus is spaced rearwardly from the seat back assembly 34. The rear end 70 has a forward mounting surface 72 and an oppositely facing rear mounting surface 74. The rear end 70 has therein a mounting hole (not shown) which extends between the forward and rear mounting surfaces 72 and 74. When the first and second side bars 56 and 58 are mounted on the respective mounting bars 26 and 28, the rear ends 70 of the first and second side bars 56 and 58 terminate several inches apart (about 8" in the illustrated embodiment). In the illustrated embodiment, the side bars are formed of ¼" steel plate which is bent to the described shape.

The bracket assembly 50 also includes means 75 for supporting the tank in alternative forward and rearward positions relative to the seat back assembly 34 in the horizontal direction. In the illustrated embodiment, the means 75 for supporting the tank in alternative forward and rearward positions includes spaced upper and lower depth adjustment bars 76 and 78. The upper depth adjustment bar 76 extends between the upper pair 52 of first and second side bars 56 and 58. The lower depth adjustment bar 78 extends between the lower pair 54 of first and second side bars 56 and 58. The upper and lower depth adjustment bars 76 and 78 are identical, and only the upper depth adjustment bar 76 will be further described. The upper depth adjustment bar 76 is an elongated member having spaced first and second ends 80 and 82 which are releasably mounted on the rear ends 70 of the respective first and second side bars 56 and 58. Each of the first and second ends 80 and 82 has a forward mounting surface 84 and an oppositely facing rear mounting surface 86. A mounting hole (not shown) extends between the forward mounting surface 84 and the rear mounting surface 86. The mounting holes are aligned with corresponding mounting holes in the rear ends 70 of the respective first and second side bars 56 and 58. Releasable fasteners 89 are received in the aligned mounting holes to releasably mount the upper depth adjustment bar 76 between the rear ends 70 of the side bars 56 and 58. In the illustrated embodiment, the releasable fasteners 89 are bolt and nut combinations (hereinafter "bolts"). In another embodiment, another suitable releasable fastener such as, for example, a screw or clamp, can be used. The upper depth adjustment bar 76 also has an elongated major portion 90 which is offset or spaced in the lateral direction from a plane extending through the first and second ends 80 and 82. The major portion 90 has a forward mounting surface 92 which is parallel to and which faces in the same direction as the forward mounting surface 84 of the first and second ends 80 and 82. The major portion 90 also has a rear mounting surface 94 which faces oppositely from the forward mounting surface 92. In the specific embodiment illustrated, the forward mounting surface 92 of the major portion 90 is offset in the lateral direction about 1" from the plane extending through the rear mounting surfaces 86 of the first and second ends 80 and 82. The major portion 90 has therein three longitudinally spaced mounting holes 96 (FIG. 4) which extend between the forward and rear mounting surfaces 92 and 94. Each of the mounting holes 96 is elongated in the vertical direction. In the illustrated embodiment, the upper and lower depth adjustment bars 76 and 78 are formed of ¼" steel plate which is bent into the described shape.

The upper depth adjustment bar 76 is releasably mounted between the upper pair 52 of first and second side bars 56 and 58. The upper depth adjustment bar 76 can be mounted in four alternative positions. In a first position (shown in FIGS. 5 and 6), the forward mounting surfaces 84 of the ends 80 and 82 abut the rear mounting surfaces 74 of the rear ends 70 of the side bars 56 and 58, such that the major portion 90 is spaced forwardly of the rear ends 70 of the side bars 56 and 58 with the forward mounting surface 92 facing forward. In the specific embodiment illustrated, when the upper depth adjustment bar 76 is mounted in the first position, the forward mounting surface 92 of the major portion 90 is spaced about 1" forward of a plane which extends through and which is defined by the rear mounting surfaces 74 of the rear ends 70 of the side bars 56 and 58.

In a second position (shown in FIG. 7), the forward mounting surface 92 faces forward as in the first position, but the rear mounting surfaces 86 of the first and second ends 80 and 82 abut the forward mounting surfaces 72 of the rear ends 70 of the side bars 56 and 58, such that the major portion 90 is spaced forward of the rear ends 70 of the side bars 56 and 58 and is slightly closer to the seat back assembly 34 than in the first position (FIGS. 5 and 6). In the specific embodiment illustrated, when the upper depth adjustment bar 76 is mounted in the second position, the forward mounting surface 92 of the major portion 90 of the upper depth adjustment bar 76 is spaced about 1.25" forward of the plane extending through the rear mounting surfaces 74 of the rear ends 70 of the side bars 56 and 58.

In a third position (shown in FIG. 8), the upper depth adjustment bar 76 is rotated or flipped 180° about the longitudinal axis thereof, so that the forward mounting surface 92 faces rearward and the rear mounting surface 94 faces forward. The forward mounting surfaces 84 of the first and second ends 80 and 82 abut the forward mounting surfaces 72 of the rear ends 70 of the first and second side bars 56 and 58, such that the major portion 90 is spaced rearward of the rear ends 70 of the second side bars 56 and 58. In the specific embodiment illustrated, when the upper depth adjustment bar 76 is mounted in the third position, the forward mounting surface 92 of the major portion 90 is spaced about 0.75" rearward of the plane defined by the rear mounting surfaces 74 of the rear ends 70 of the side bars 56 and 58.

In a fourth position shown in FIG. 9, the upper depth adjustment bar 76 is flipped about the longitudinal axis thereof (as in third position (FIG. 8)), so that the forward mounting surface 92 faces rearward as in the third position. The rear mounting surfaces 86 of the first and second ends 80 and 82 abut the rear mounting surfaces 74 of the rear ends 70 of the respective first and second side bars 56 and 58, such that the major portion 90 is spaced rearwardly of the rear ends 70 of the first and second side bars 56 and 58 and is slightly farther from the seat back assembly 34 than in the third position (FIG. 8). In the specific embodiment illustrated, when the upper depth adjustment bar 76 is mounted in the fourth position, the forward mounting surface 92 of the major portion 90 is spaced about 1" rearward of the plane defined by the rear mounting surfaces 74 of the rear ends 70 of the side bars 56 and 58.

The bracket assembly 50 includes a vertical support bar 96. The vertical support bar 96 is an elongated member having spaced upper and lower ends 98 and 100. The vertical support bar 96 also includes a rest 101 which extends generally in the horizontal direction from the lower end 100 for supporting the bottom of the tank. The vertical support bar 96 has an elongated forward mounting surface 102 and a rear mounting surface 104 which faces oppositely from the forward mounting surface 102. The vertical support bar 92 has therein two longitudinally spaced sets of first mounting holes 106. The rear mounting surface 104 abuts the upper and lower depth adjustment bars 76 and 78, such that two of the mounting holes 106 (FIG. 6) are aligned with respective of the mounting holes 96 in the upper and lower depth adjustment bars 76 and 78. Bolts 89 are received in the aligned mounting holes to releasably secure the vertical support bar 96 to the upper and lower depth adjustment bars 76 and 78. The vertical support bar 92 also has therein two longitudinally spaced sets of second mounting holes 110 (FIG. 4).

Upper and lower tank clips 112 and 114 are mounted on the forward mounting surface 102 adjacent the upper and lower ends 98 and 100 of the vertical support bar 92 for releasably receiving and supporting the tank. The upper and lower tank clips 112 and 114 are releasably secured on the forward mounting surface 102 by bolts 89. More particularly, each of the upper and lower tank clips 112 and 114 has therein a set of diagonally spaced mounting holes 118 (FIG. 6). The bolts 89 extend through the mounting holes 118 and respective of the second mounting holes 110 in the vertical support bar 92 to releasably secure the upper and lower tank clips 112 and 114 to the vertical support bar 92. In the arrangements shown in FIGS. 1–6 and 7, the tank clips 112 and 114 have a diameter of about 7 inches for receiving a so-called "30 minute" tank of air. In the arrangements illustrated in FIGS. 8 and 9, the tank clips 112 and 114 have been replaced with respective larger tank clips 212 and 214 (214 is not shown) for receiving a larger "45 minute" tank having a diameter of about 9 inches.

A pair of flexible tank straps 120 is mounted on the vertical support bar 92 intermediate the upper and lower ends 98 and 100. The outer ends 122 of the tank straps include a releasable buckle-type connector. The tank straps 120 extend around the tank and the outer ends thereof are releasably joined together by the buckle-type connector. The tank straps 120 thus cooperate with the upper and lower tank clips 112 and 114 to releasably secure the tank therein.

Illustrated in FIG. 7 is an alternative arrangement 210 of the seat wherein the tank clips 112 and 114 are in a second position spaced slightly closer in the forward horizontal direction to the seat back assembly 34 than in the first position (FIGS. 1–6). The seat 10 (FIGS. 1–6) has been changed from the first position (FIGS. 1–6) by mounting the upper and lower depth adjustment bars 76 and 78 in the second position (previously described) on the respective upper and lower pairs 52 and 54 of side bars 56 and 58. In particular, the upper and lower depth adjustment bars 76 and 78 have been removed from the respective upper and lower pairs 52 and 54 of side bars 56 and 58 by removing the bolts 89 and have been repositioned on the respective upper and lower pairs 52 and 54 of side bars 56 and 58 by placing the rear mounting surfaces 86 of the ends 80 and 82 thereof in abutment with the respective forward mounting surfaces 72 of the rear ends 70 of the side bars 56 and 58, and the bolts 89 have been replaced. When mounted in the second position, the forward mounting surface 92 and thus the tank clips 112 and 114 are spaced further (about 0.5" more) forward than in the first position (FIGS. 1–6).

Illustrated in FIG. 8 is a second alternative arrangement 310 wherein the larger tank clips 212 and 214 (214 is not shown) are used with the depth adjustment bars 76 and 78 in the third position (previously described) to receive a larger tank. In the specific embodiment illustrated, the tank is a "45 minute" tank having a diameter of about 9 inches. The seat 310 has been changed from the configuration illustrated in FIGS. 1–6 by mounting the upper and lower depth adjustment bars 76 and 78 in the third position on the respective side bars 56 and 58. The upper and lower depth adjustment bars 76 and 78 have been removed from the respective upper and lower pairs 52 and 54 of first and second side bars 56 and 58 by removing the bolts 89, and the vertical support bar 96 has been removed from the upper and lower depth adjustment bars 76 and 78 by removing the bolts 89. The upper and lower depth adjustment bars 76 and 78 have been flipped 180° about the respective longitudinal axes thereof, such that the forward mounting surface 92 faces rearward. The upper and lower depth adjustment bars 76 and 78 have been remounted on the respective upper and lower pairs 52 and 54 of side bars 56 and 58 by placing the forward mounting surfaces 84 of the ends 80 and 82 in abutment with the forward mounting surfaces 72 of the ends 70 of the side bars 56 and 58 and replacing the bolts 89. Accordingly, the major portion 90 is spaced rearward from the rear ends 70 of the side bars 56 and 58 with the forward mounting surface 92 facing rearward. The vertical support bar 96 has been remounted with the rear mounting surface 104 in abutment with the rear mounting surfaces 94 of the respective upper and lower depth adjustment bars 76 and 78 by replacing the bolts 89. The smaller tank clips (not shown) have been removed by removing the bolts 89 and replaced with larger diameter upper and lower tank clips 212 and 214 (214 is not shown) by replacing the bolts 89.

Illustrated in FIG. 9 is a third alternative arrangement 410 wherein the larger tank clips 212 and 214 (214 is not shown) are used with the depth adjustment bars 76 and 78 in the fourth position (previously described). The seat 410 has been changed from the arrangement 310 (FIG. 8) by mounting the upper and lower depth adjustment bars 76 and 78 in the fourth position on the respective side bars 56 and 58. The upper and lower depth adjustment bars 76 and 78 have been removed from the respective upper and lower pairs 52 and 54 of first and second side bars 56 and 58 by removing the bolts 89 and have been remounted on the respective upper and lower pairs 52 and 54 of first and second side bars 56 and 58 by placing the rear mounting surfaces 86 in abutment with the rear mounting surfaces 74 of the ends 70 of the side bars 56 and 58 and replacing the bolts 89, such that the major portion 90 is spaced farther in the rearward direction from the rear ends 70 of the side bars 56 and 58 than in the third position.

It is an advantage that the bracket assembly 40 is readily adjustable for accommodating tanks of different sizes without removing the seat 10 from the vehicle and without removing the entire bracket assembly 40 from the vertical frame members 16 and 18. It is a further advantage that the bracket assembly 40 is adjustable for positioning the tank clips in different horizontal positions relative to the seat back assembly 34 for supporting the tank in different positions relative to the seat back assembly 34.

Various features of the invention are set forth in the following claims.

What is claimed is:

1. A vehicle seat for supporting a person wearing a self-contained breathing apparatus, the self-contained breathing apparatus including a tank, the seat comprising:

a frame including a pair of vertical frame members, the vertical frame members being spaced apart to permit the tank to be passed therebetween; and a bracket assembly between the vertical frame members for releasably supporting the tank, the bracket assembly including a pair of side members extending rearwardly from the respective vertical frame members, the bracket assembly including a depth adjustment bar releasably mounted between the side members, and the bracket assembly including a tank clip supported by the depth adjustment bar for receiving the tank, and the depth adjustment bar having spaced ends and an intermediate portion between the ends and for supporting the tank clip, and wherein the depth adjustment bar is alternatively mountable between the side members so as to be reversible between a first reversible position wherein the intermediate portion is in a forward position, and a second reversible position wherein the intermediate portion is rearward of the position of the intermediate portion in the first position.

2. A vehicle seat as set forth in claim 1 wherein the spaced ends of the depth adjustment bar abut the respective side bars, and wherein the intermediate portion is offset from a plane extending through the ends thereof, and wherein the first position is adapted for a tank having a small diameter to be received in the bracket assembly, and the second position is adapted for a tank having a large diameter to be received in the bracket assembly.

3. A vehicle seat as set forth in claim 1 and the tank clip being adapted to receive the small tank, the tank clip being removable from the bracket assembly for a large tank clip to be mounted thereon for receiving the large tank.

4. A vehicle seat for supporting a person wearing a self-contained breathing apparatus, the self-contained breathing apparatus including a tank, the seat comprising:

a frame including a pair of vertical frame members, the vertical frame members being spaced apart to permit the tank to be passed therebetween; and a bracket assembly extending between the vertical frame members for releasably supporting the tank, the bracket assembly including a pair of side bars extending rearwardly from the respective vertical frame members, the bracket assembly including a depth adjustment bar releasably mounted between the side bars, and the bracket assembly including a tank clip supported by the depth adjustment bar for receiving the tank; the bracket assembly further including a second pair of side bars extending rearwardly from respective of the vertical frame members, the bracket assembly including a second depth adjustment bar releasably mounted between the second pair of side bars, and the bracket assembly including a second tank clip, the depth adjustment bar and the second depth adjustment bar supporting the tank clip and the second tank clip for receiving the tank.

5. A vehicle seat as set forth in claim 4 and the bracket assembly further including a vertical support bar releasably mounted on the depth adjustment bars and supporting the tank clip and the second tank clip.

6. A vehicle seat as set forth in claim 1 and further including a seat back assembly supported by the frame, the bracket assembly extending rearwardly of the seat back assembly.

7. A vehicle seat as set forth in claim 6 and the seat back assembly including a pair of spaced seat back cushion members supported by respective of the vertical frame members, the seat back cushion members being spaced apart to permit the tank to be passed therebetween, the bracket assembly extending rearwardly the seat back cushion members for receiving the tank.

8. A vehicle seat for supporting a person wearing a self-contained breathing apparatus, the self-contained breathing apparatus including a tank, the seat comprising:

a frame including a pair of vertical frame members, the vertical frame members being spaced apart to permit the tank to be passed therebetween; and a bracket assembly extending between the vertical frame members for releasably supporting the tank, the bracket assembly including an upper pair of side bars extending rearwardly from respective of the vertical frame members, the bracket assembly including an upper depth adjustment bar releasably mounted between the upper pair of side bars, the bracket assembly including a lower pair of side bars extending rearwardly from the respective vertical frame members, the bracket assembly including a lower depth adjustment bar releasably mounted between the lower pair of side bars, and the bracket assembly including a tank clip supported by one of the upper and lower depth adjustment bars for receiving the tank.

9. A vehicle seat as set forth in claim 8 and each of the upper and lower depth adjustment bars having spaced ends which abut the respective side bars, each of the upper and lower depth adjustment bars having a major portion intermediate the ends thereof for supporting the tank clip, the major portion being offset from a plane extending through the ends of the respective upper or lower depth adjustment bar, each of the upper and lower depth adjustment bars being mountable between the respective side bars in a first position such that the major portion is in a forward position for a tank having a small diameter to be received in the bracket assembly, each of the upper and lower depth adjustment bars alternatively being mountable between the respective side bars in a second position such that the major portion is in a rear position spaced rearward from the forward position for a tank having a large diameter to be received in the bracket assembly.

10. A vehicle seat as set forth in claim 8 and the tank clip being adapted to receive the small tank, the tank clip being removable from the bracket assembly for a large tank clip to be mounted thereon for receiving the large tank.

11. A vehicle seat as set forth in claim 8 and the bracket assembly further including a vertical support bar releasably mounted on the upper and lower depth adjustment bars and supporting the tank clip.

12. A vehicle seat as set forth in claim 11 and the bracket assembly further including a second tank clip supported on the vertical support bar.

13. A vehicle seat as set forth in claim 8 and further including a seat back assembly supported by the frame, the bracket assembly extending rearwardly of the seat back assembly.

14. A vehicle seat as set forth in claim 13 and the seat back assembly including a pair of spaced seat back cushion members supported by the respective vertical frame members, the seat back cushion members being spaced apart to permit the tank to be passed therebetween, the bracket assembly extending rearwardly the seat back cushion members for receiving the tank.

15. A vehicle seat for supporting a person wearing a self-contained breathing apparatus, the self-contained breathing apparatus including a tank, the seat comprising:

a frame including a pair of vertical frame members, the vertical frame members being spaced apart to permit the tank to be passed therebetween;

a bracket assembly extending between the vertical frame members for releasably supporting the tank, the bracket assembly including an upper pair of side bars extending rearwardly from the respective vertical frame members, the bracket assembly including an upper depth adjustment bar releasably mounted between the upper pair of side bars, the bracket assembly including a lower pair of side bars extending rearwardly from the respective vertical frame members, the bracket assembly including a lower depth adjustment bar releasably mounted between the lower pair of side bars, each of the upper and lower depth adjustment bars having spaced ends which abut the respective side bars, each of the upper and lower depth adjustment bars having a major portion intermediate the ends thereof for supporting the tank clip, the major portion being offset from a plane extending through the ends of the respective upper or lower depth adjustment bar, each of the upper and lower depth adjustment bars being mountable between the respective side bars in a first position such that the major portion is in a forward position for a tank having a small diameter to be received in the bracket assembly, each of the upper and lower depth adjustment bars alternatively being mountable between the respective side bars in a second position such that the major portion is in a rear position spaced rearward from the forward position for a tank having a large diameter to be received in the bracket assembly, and the bracket assembly including a tank clip supported by one of the upper and lower depth adjustment bars for receiving the tank;

a seat back assembly supported by the frame, the seat back assembly including a pair of spaced seat back cushion members supported by the respective vertical frame members, the seat back cushion members being spaced apart to permit the tank to be passed therebetween, the bracket assembly extending rearwardly of the seat back cushion members for receiving the tank;

a seat cushion supported by the frame bottom; and a headrest assembly supported by the vertical frame members.

16. A vehicle seat as set forth in claim 15 and the tank clip being adapted to receive the small tank, the tank clip being removable from the bracket assembly for a large tank clip to be mounted thereon for receiving the large tank.

17. A vehicle seat as set forth in claim 15 and the bracket assembly further including a vertical support bar releasably mounted on the upper and lower depth adjustment bars and supporting the tank clip.

18. A vehicle seat as set forth in claim 17 and the bracket assembly further including a second tank clip supported on the vertical support bar for receiving the tank.

19. A vehicle seat as set forth in claim 15 and the headrest assembly including a pair of headrest members mounted for pivotal movement relative to the seat back cushion members to permit the tank to be received in and removed from the tank clips.

* * * * *